(12) United States Patent
Troubounis et al.

(10) Patent No.: US 8,540,884 B2
(45) Date of Patent: Sep. 24, 2013

(54) FLOTATION APPARATUS WITH APERTURED PLATE

(75) Inventors: George Troubounis, Munich (DE); Lucas Menke, Munich (DE)

(73) Assignee: Meri Entsorgungstechnik fuer die Papierindustrie GmbH, Munich (DE)

( * ) Notice: Subject to any disclaimer, the term of this patent is extended or adjusted under 35 U.S.C. 154(b) by 833 days.

(21) Appl. No.: 12/597,903

(22) PCT Filed: Apr. 2, 2008

(86) PCT No.: PCT/EP2008/002613
§ 371 (c)(1),
(2), (4) Date: Apr. 14, 2010

(87) PCT Pub. No.: WO2008/135124
PCT Pub. Date: Nov. 13, 2008

(65) Prior Publication Data
US 2010/0300990 A1    Dec. 2, 2010

(30) Foreign Application Priority Data

Apr. 27, 2007  (DE) .......................... 10 2007 020 029

(51) Int. Cl.
*C02F 1/24*  (2006.01)
*B01D 21/02*  (2006.01)

(52) U.S. Cl.
USPC ......... 210/703; 210/802; 210/221.2; 210/521

(58) Field of Classification Search
USPC ................ 210/703, 802, 221.2, 521
See application file for complete search history.

(56) References Cited

U.S. PATENT DOCUMENTS

| 3,221,889 A | 12/1965 | Hirsch |
| 4,194,976 A | 3/1980 | Robinsky |
| 4,206,030 A * | 6/1980 | Santora .......................... 204/242 |
| 4,544,487 A | 10/1985 | Bosnjak |

(Continued)

FOREIGN PATENT DOCUMENTS

| DE | 16 42 871 B | 3/1968 |
| EP | 0 814 885 B1 | 11/1998 |

(Continued)

OTHER PUBLICATIONS

Official Letter of Japanese Patent Office of May 13, 2011 and English translation thereof.

*Primary Examiner* — Thomas M Lithgow
(74) *Attorney, Agent, or Firm* — Kilpatrick Townsend & Stockton LLP

(57) ABSTRACT

A flotation apparatus (10) for the separation of solid particles from a suspension with formation of a fraction lacking in solid particles and a fraction rich in solid particles comprises a tank with an inlet (14) for the suspension, with an outlet (16) for the fraction lacking in solid particles, with an outlet (18) for the fraction rich in solid particles, and with at least one block of slats (20) composed of multiple overlapping slats (22), wherein the at least one block of slats (20) has a rear side oriented toward the tank wall and a front side arranged on the opposite side of the block of slats (20). On the rear side of the at least one block of slats, a plate (26) is arranged which extends over at least a part of the rear side of the block of slats, wherein the plate has a plurality of openings which facilitate the penetration of liquid through the plate. The sum of the areas of the individual openings (38) in the upper region, relative to the vertical axis, of the plate, per square centimeter of the plate, is greater than the sum of the areas of the individual openings in the lower region of the plate, per square centimeter of the plate.

22 Claims, 3 Drawing Sheets

(56) References Cited

U.S. PATENT DOCUMENTS

Figure 1:
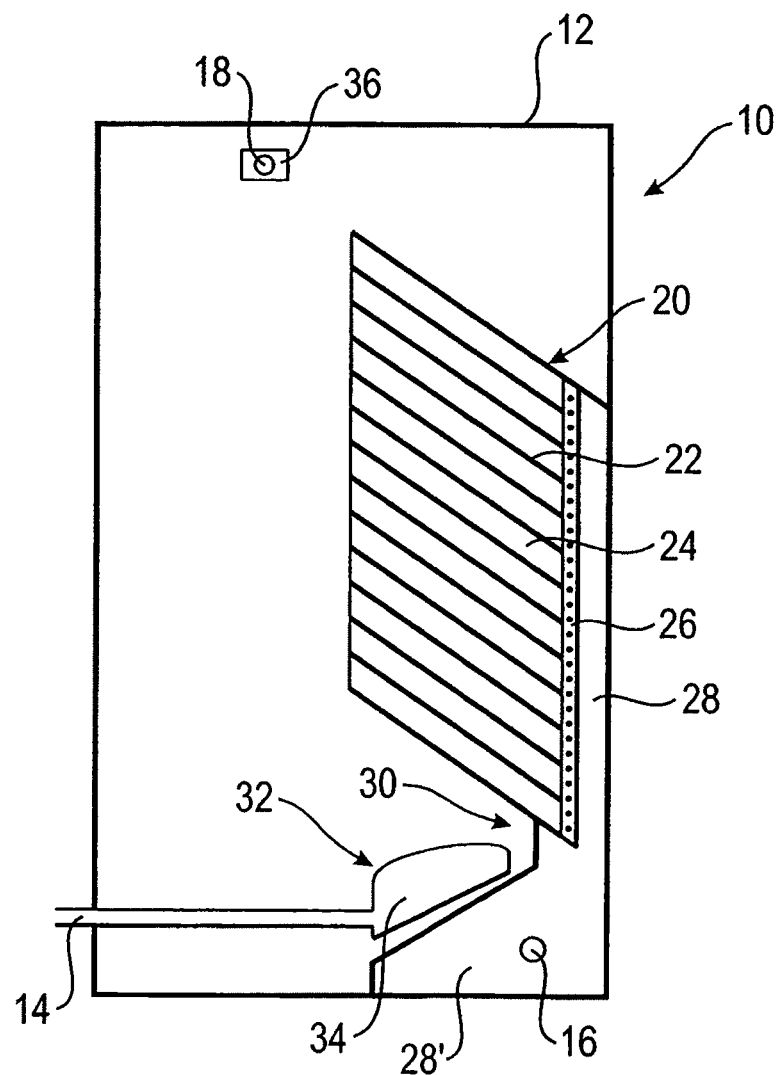

| | | | |
|---|---|---|---|
| 5,662,804 A * | 9/1997 | Dufour | 210/703 |
| 6,174,435 B1 * | 1/2001 | Kaltchev | 210/221.2 |
| 7,445,709 B2 * | 11/2008 | Beaule et al. | 210/221.2 |

FOREIGN PATENT DOCUMENTS

| | | |
|---|---|---|
| EP | 1 193 342 A1 | 9/2000 |
| JP | 47-26813 A | 7/1972 |
| JP | 55-35962 A | 9/1980 |
| JP | 55-119457 A | 9/1980 |
| JP | 59-160510 A | 9/1984 |
| JP | 8-1146 A | 1/1996 |
| JP | 11-502761 A | 3/1999 |
| WO | WO 84/01724 A1 | 5/1984 |
| WO | WO 96/29134 A1 | 9/1996 |

* cited by examiner

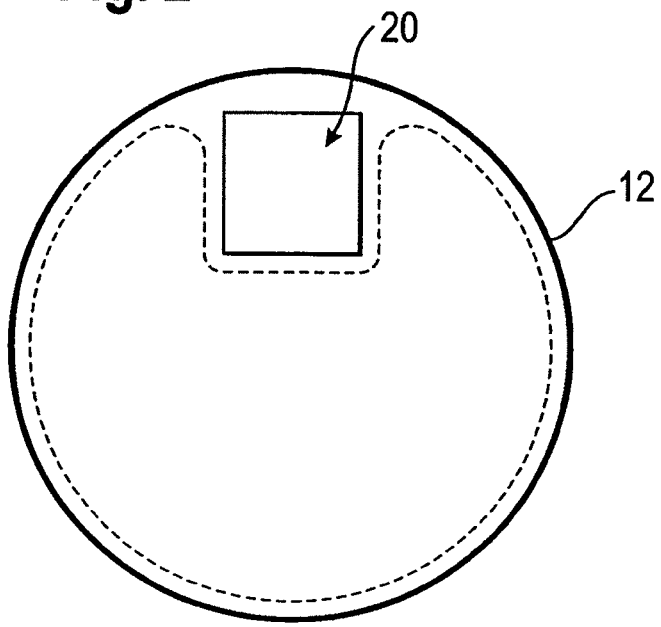
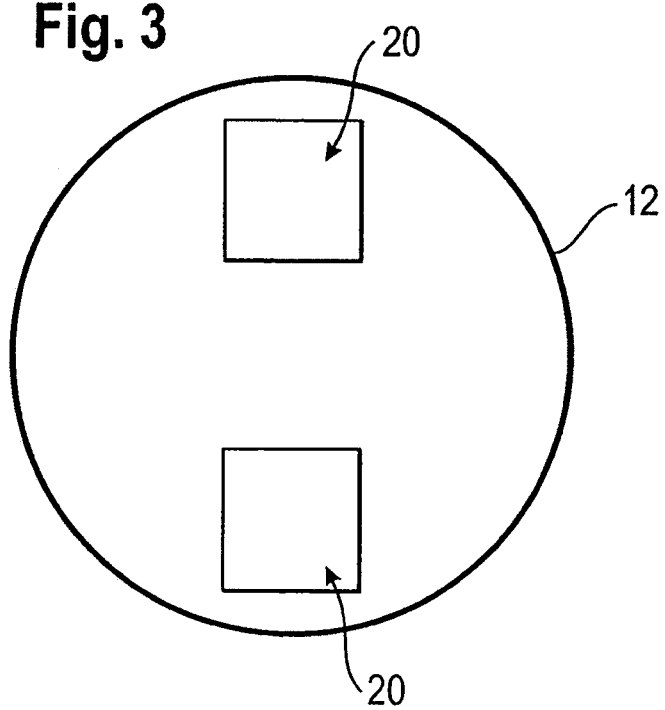

FLOTATION APPARATUS WITH APERTURED PLATE

CROSS-REFERENCE TO RELATED APPLICATIONS

This application is a National Stage of International Application No. PCT/EP2008/002613 filed Apr. 2, 2008, and which claims the benefit of German Patent Application No. 10 2007 020 029.5, the disclosures of which are incorporated herein by reference.

The present invention relates to a flotation apparatus for the separation of solid particles from a suspension while forming a fraction low in solid particles and a fraction rich in solid particles, the apparatus including a container having an inlet for a suspension, an outlet for the fraction low in solid particles, an outlet for the fraction rich in solid particles and also with at least one block of slats assembled from a plurality of slats arranged above one another. Furthermore, the present invention relates to a method for the separation of solid particles from a suspension while forming a fraction low in solid particles and a fraction rich in solid particles.

Flotation is a physical separating method for the separation of solid materials from an aqueous suspension with the aid of gas bubbles in which the different surface tension of solid materials relative to the liquid, mainly water and gases, mainly air, is exploited. In addition to dispersive selective flotation, a pressure relief flotation* is also known. Whereas, in the first named variant, comparatively large gas bubbles are introduced into the liquid, so that a plurality of smaller particles adhere to a gas bubble, in the last named method variant comparatively small gas bubbles are introduced into the liquid so that a plurality of small gas bubbles adhere to one particle.

*translators note: also frequently translated as "dissolved air flotation"

A flotation is used in an aqueous suspension, for example for the separation of the fine grained solid quantity, among other things of ores and vein-stuff, with air being introduced and finely distributed in flotation bath by a fast stirrer or lances. In this connection tensides and foam stabilizers contained in the flotation bath stabilize the air bubbles. One type of particle can only be poorly wetted with water and thus adheres to the air bubbles. These particles float up with the air bubbles and can be skimmed off with the foam. The remaining particles are intended to remain in the slick and are pumped off at the end of the flotation process.

In the manufacture of paper from waste paper a water/waste paper mixture is subjected to flotation in order to remove the printing color. In just the same way in the flotation process serves for cleaning of waste water in sewage treatment plants in order to bind fine contaminant particles and suspended materials. In medicine flotation methods are used for the detection of parasite eggs in excretia.

Customary flotation apparatus for carrying out a pressure relief flotation include a container in which the liquid to be treated, which is saturated with air, is introduced through a feed line. On entry into the container the liquid saturated with air undergoes pressure reduction which is why air bubbles arise in the container with a size of a few microns. These air bubbles adhere to the particles suspended in the liquid and form with them flocks capable of floating so that a floating slime layers arises at the surface of the liquid which can be mechanically scraped out of the liquid with a scraper device and is removed from the container. The remaining liquid which is at least largely freed of solid particles is extracted via one or more outlets as clarified water. In order to increase the effectiveness of the flotation apparatus it is customary to provide a number of slats in the flotation container which extend obliquely relative to the container axis and which serve as impact plates, whereby the surface separation of the flotation apparatus is increased and the ratio of flow to surface area is increased, whereby the separation of the solid particles is favored.

A flotation apparatus is known from EP 0 814 885 B1 which includes a vertically arranged container which has a plurality of obliquely arranged slats in addition to a feed device for suspension, an injection device for the introduction of gas, a liquid outlet and a scraper device.

A flotation apparatus for the separation of materials or material mixtures from suspensions for the formation of at least one fraction rich in material and one fraction low in material is disclosed in EP 1 193 342 A 1 and has a column-like separation container which has at the bottom a suspension inlet, also a plurality of slats arranged obliquely above one another, a first outlet for the fraction low in material and, arranged in the upper region, also a second outlet for the fraction richer in material, with the suspension inlet bringing about a central, vertically directed main flow, with the slats being arranged radially outside of the main flow and bringing about an outwardly and obliquely downwardly directed flow for the fraction low in material and with a ring-like collection channel for the fraction low in material being formed radially outside of the slats. Through the arrangement of the vertical flow radially upwardly and through the arrangement of the slats radially outside of the main flow, the flow of the fraction low in material should be directed radially outwardly and thus increasingly slow down, which is intended to bring about a better separation of the particles. A further advantage is intended to exist in that the fraction low in material is collected at the outer periphery of the container, i.e. behind the downstream edges of the slats whereby further separating stages can be provided with a small space requirement whether it be further flotation stages or filtration stages. Through an intentional cascade-like sequence or a plurality of separating stages, in particular flotation stages of different principles, it should be possible to generate a plurality of fractions of different material contents.

A disadvantage of the above-named flotation apparatuses however lies in the fact that, in relation to the height of the flotation container, no uniform extraction of liquid takes place via the slats. On the contrary, amongst other things, as a result of the hydrostatic pressure which varies over the height of the flotation container, clarified water is principally drawn off via the lower slats whereas the clarified water take off via the upper slats takes place to a significantly lower degree. Since the degree of cleaning of the clarified water which is guided over the slats and drawn off becomes smaller as the liquid volume which is guided per unit of time through the slats becomes larger, the clarified water drawn off via the lower slats has a lower purity with respect to solid particles than the clarified water drawn off via the upper slats. Consequently, the maximum cleaning capacity of the flotation apparatus is not achieved.

The object of the present invention is thus to make available a flotation apparatus for the separation of solid particles from a suspension while forming a fraction low in solid particles and the fraction rich in solid particles, with the apparatus having a high cleaned capacity and in which the degree of cleaning related to the projected slat area and to the volume through-put is in particular increased relative to the degree of cleaning attainable with the flotation apparatuses known from the prior art.

In accordance with the invention this object is satisfied by a flotation apparatus in accordance with patent claim 1 and in particular by a flotation apparatus for the separation of solid particles from a suspension while forming a fraction low in solid particles and a fraction rich in solid particles, the apparatus comprising a container having an inlet for the suspension, an outlet for the fraction low in solid particles, an outlet for the fraction rich in solid particles and also with at least one block of slats assembled from a plurality of slats arranged above one another, wherein the at least one block of slats has a rear side oriented towards the container wall and a front side arranged at the opposite side of the block of slats and wherein a plate extending over at least a part of the rear side of the block of slats is arranged at the rear side of the at least one block of slats, with the plate having a plurality of openings which enable the passage of liquid through the plates, with the sum of the areas of the individual openings in the upper region of the plate related to the vertical direction per square centimeter of the plate being larger than the sum of the areas of the individual openings in the lower region of the plate per square centimeter of the plate.

Under a plurality of openings at least two openings are to be understood in the sense of the present invention.

Surprisingly, in the context of the present invention, it could be found that a uniform extraction of clarified water can be achieved at the rear side of the block of slats over the height of the flotation container through the provision of a plate having a plurality of openings, i.e. at least two openings, which is subsequently also designated as an apertured plate, in which, related to the vertical direction, the sum of the areas of the individual openings is larger in the upper region of the plate per square centimeter of the plate than the sum of the areas of the individual openings in the lower region of the plate per square centimeter of the plate. As a result of the apertured plate having a larger total area of the openings in its upper region related to the vertical direction or to the longitudinal axis of the container (which is preferably vertical) than in its lower region, it is reliably ensured that with the same hydrostatic pressure in the upper and in the lower region of the flotation container a larger liquid flow is guided through the upper slats and through the lower slats so that under the real conditions in the operation of the flotation apparatus, in which the hydrostatic pressure is larger in the lower region of the container than in the upper region of the container, the larger liquid flow through the lower slats which comes about as a result of the higher hydrostatic pressure in the lower region of the flotation container in comparison to the upper region of the flotation container is compensated, so that as a result in each case a liquid flow of the same size flows through the upper and the lower slats. In this way the specific hydraulic loading is made more even and from this an ideal degree of cleaning per projected slat area is achieved. In other words it can be achieved through the provision of the apertured plate that the same quantity of clarified water is drawn off per unit of time through the upper slats and the lower slats irrespective of the higher hydrostatic pressure in the lower region of the flotation container, so that with the given projected slat area and the given volume throughput, a higher degree of cleaning is achieved. Consequently, the maximum or at least the almost maximum cleaning capacity of the flotation container can be exploited.

Alternatively to this, the apertured plate or the plate having at least two openings can be arranged at the front side of the at least one block of slats. By way of example two blocks of slats can be arranged behind one another in the container of the flotation apparatus, with the apertured plate being provided between the two blocks of slats so that the apertured plate is arranged at the rear side of the first block of slats and at the front side of the second block of slats.

In accordance with a preferred embodiment of the present invention the sum of the areas of the individual openings related to the total area of the (apertured) plate amounts to 0.1 to 20%. Particularly good results are in particular obtained when the sum of the areas of the individual openings related to the total area of the plate amounts to 0.2 to 10% and particularly preferably to 0.4 to 5%. In this way a good liquid flow through the apertured plate can be achieved.

A fluid flow of almost exactly the same size is achieved through the upper and the lower slats in particular when, for the apertured plate, the sum of the areas of the individual openings per square centimeter of the plate increases when viewed in a vertical direction from the bottom to the top, with the sum of the areas of the individual openings per square centimeter of the plate preferably increasing from the bottom to the top inversely proportional to the hydrostatic pressure which prevails in the respective region of the container.

In order to achieve a situation in which the sum of the areas of the individual openings in the upper region of the plate per square centimeter of the plate is larger than the sum of the areas of the individual openings in the lower region of the plate per square centimeter of the plate it is proposed, in accordance with a further preferred embodiment of the present invention, that the plate has a plurality of openings, with more openings being provided per square centimeter in the upper region of the plate than in the lower region of the plate. The individual openings preferably have in this embodiment in each case an area of the same size or of at least substantially the same size. An opening of substantially the same size will be understood in the sense of the present invention such that each opening has at least 70% of the area of the largest opening.

As an alternative to the above-named embodiment it is also possible for the apertured plate to have a plurality of openings, with the openings in the upper region of the plate each having a larger area than the individual openings in the lower region of the plate. In this embodiment it is preferred that 70 to 130 percent as many openings per square centimeter, preferably 85 to 115 percent as many openings per square centimeter, and particularly preferably approximately as many openings per square centimeter are provided in the upper region of the plate as in the lower region of the plate.

Naturally, it is also possible to combine the above-named embodiments, i.e. for example to provide smaller openings but more openings in the upper region of the apertured plate than in the lower region of the plate, or to provide larger openings but fewer openings in the upper regions of the apertured plate than in the lower region of the apertured plate or to provide larger and more openings in the upper region of the apertured plate than in the lower region of the apertured plate, so long as the sum of the areas of the individual openings in the upper region of the plate per square centimeter of the plate is larger than the sum of the areas of the individual openings in the lower region of the plate per square centimeter of the plate.

The present invention is basically not restricted to a specific geometry of the individual apertured plates. Thus the individual openings can have any desired polygonal or round geometry, with the openings all having the same or respectively different geometries. Good results are in particular obtained when the openings have an elliptical, circularly round, rectangular or square cross-section.

The apertured plate is preferably arranged such that it has an inclination of 0 to 45°, preferably from 0 to 22.5°, particularly preferably from 0 to 10° and especially preferably from 0 to 5° related to the vertical direction, i.e. the longitudinal axis of the container.

The geometric shape of the block of slats is not restricted in the present invention. Moreover, the term block of slats designates only an aggregation of at least two slats without having to specify any geometrical shape for this aggregation of slats. In order to efficiently satisfy their separating task the individual slats are preferably arranged in a block of slats, preferably substantially parallel to one another.

In order to achieve a good separating efficiency for the smallest possible cross-sectional area of the flotation container it is proposed, as a further development of the concept of the invention, that the individual slats of the at least one block of slats be obliquely arranged with reference to the cross-section of the container or with reference to the horizontal. In the context of the present invention it has proved to be in particularly advantageous that the individual slats of the at least one block of slats are arranged parallel to one another or substantially parallel to one another, and arranged obliquely outwardly with reference to the cross-section of the container and downwardly with reference to the horizontal direction.

Good results are in particular obtained when the individual slats of the at least one block of slats have an inclination of 5 to 75°, preferably of 10 to 60° and especially preferably of 30 to 45° in relation to the horizontal.

The present invention is also not restricted with respect to the geometry of the individual slats. It is for example possible to make at least some of the slats as multi-layer preferably comb-like structure having two outer layers and connection structures arranged therebetween, with through-going flow channels preferably being formed between the outer layers. This results in a high strength of the slats.

The at least one block of slats is preferably in the form of an oblique parallelepiped.

The present invention is also not restricted with respect to the geometrical shape of the flotation container. For example the container can have a circular elliptical or polygonal cross-section. The longitudinal axis of the container is preferably arranged parallel to the vertical direction. The separating performance of the flotation apparatus between solid particles and liquid is to a certain degree also influenced by the flow relationships which are set in the container of the flotation apparatus. It should in particular be insured by the flow relationships that are set that a uniform feed of suspension takes place across the cross-section of the container of the flotation apparatus.

In accordance with a preferred embodiment of the present invention, the inlet for the suspension is arranged in the lower region of the container and is designed such that it brings about a central, vertically upwardly directed main flow related to the container cross-section. In this embodiment preferably two to four and particularly preferably two blocks of slats are provided in the container of the flotation apparatus which are especially preferably uniformly distributed over the cross-section of the container and are for example made in the form of oblique parallelepipeds. In this way a situation is achieved in which the same liquid composition is fed through each individual block of slats with respect to its composition that is to say its proportion of liquid and solid particles. Moreover, through the alignment of the vertical flow radially upwardly and the arrangement of the slats radially outside of the main flow due to the central alignment of the flow a situation is achieved in which the flow of the fraction low in solid particles is directed radially outwardly and is thus increasingly slowed down which brings about a particularly good separation of the solid particles.

As an alternative to the above-named embodiment it is possible, in accordance with a further preferred embodiment, to provide, in the container of the flotation apparatus, a block of slats which is preferably in the shape of an oblique parallelepiped and which preferably extends from the centre of the container up to a spacing to the container wall. In this embodiment, a container of the flotation apparatus preferably has a circular cross-section and the inlet for the suspension is preferably arranged in the lower region of the container and designed such that it brings about a horseshoe-like vertically upwardly directed main flow related to the container cross-section. In this embodiment, additional free area for the flotation is obtained.

In order to be able to set the flow relationships as desired, it is proposed, as a further development of the concept underlying the invention, that the inlet for the suspension should include a feed line and a deflection means which is of hood-like design, with the upper region of the hood related to the vertical direction being closed and the lower region and the side region of the hood being open. In this embodiment, the deflection means is preferably arranged perpendicular to the longitudinal axis of the container. Through the provision of the deflection means it can be ensured that a uniform supply of suspension takes place over the cross-section of the container of the flotation apparatus.

In order to avoid a through-mixing in the container of the flotation apparatus of the liquid guided and cleaned through the slats with a non-cleaned suspension, a collection channel for the fraction low in solid particles is preferably provided behind the plate arranged at the rear side of the at least one block of slats, with the collection channel preferably being spatially separated from the remaining part of the container.

In accordance with a further preferred embodiment of the present invention, it is preferred to provide a feed for chemical additives in the region of the inlet for the suspension. With the aid of this feed suitable chemical additives can be introduced into the suspension located in the container of the flotation apparatus in order to optimize the flotation.

In order to be able to skim off the mud containing solid material which collects in the upper region of the container of the flotation apparatus it is proposed, as a further development of the concept of the invention, to provide a skimming device as a mud scraper in the container.

A further subject of the present invention is a method for the separation of solid particles from a suspension while forming a fraction low in solid particles and a fraction rich in solid particles, with the method being carried out in a flotation apparatus in accordance with the invention as previously described.

In the following the present invention will be described by way of example only with reference to advantageous embodiments and the accompanying drawings.

Figure 5:
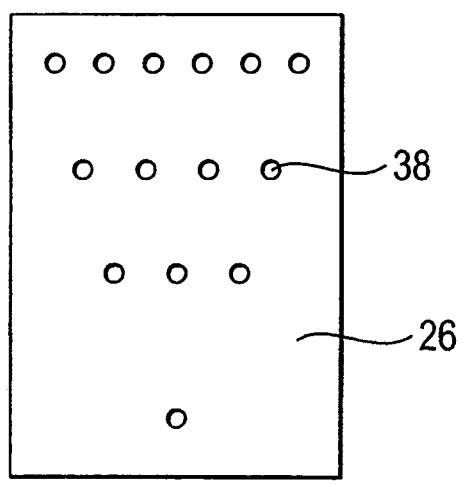

There are shown:

FIG. 1 a longitudinal section of a flotation apparatus in accordance with a first embodiment of the present invention, FIG. 2 a cross-section of the flotation apparatus shown in FIG. 1, FIG. 3 a cross-section of the flotation apparatus in accordance with a second embodiment of the present invention, a schematic view of an apertured plate in accordance with a first embodiment which can be used in the flotation apparatus in accordance with the present invention and FIG. 5 a schematic view of an apertured plate in accordance with a second embodiment which can be used in the flotation apparatus in accordance with the present invention.

The flotation apparatus 10 shown in FIG. 1 for the separation of solid particles from a suspension while forming a fraction low in solid particles and a fraction rich in solid particles includes a container 12, which is of cylindrical shape and vertically arranged. The container 12 has an inlet for a suspension 14, an outlet for the fraction 16 low in solid particles, an outlet for the fraction 18 rich in solid material particles and also a block of slats 20.

The block of slats 20 is put together from a plurality of individual slats 22 which are arranged parallel to one another in the form of a stack. The spacings between the individual slats 22 relative to one another are of the same size so that channels 24 of the same size form between the individual slats 22. The individual slats 22 are inclined downwardly relative to the horizontal and considered from the centre of the container 12 to the wall of the container 12. In total the block of slats 20 has the form of an oblique parallelepiped which extends in the longitudinal direction of the container 12 approximately from the centre of the container up to a spacing from the wall of the container 12.

At the side of the block of slats 20 facing the wall of the container 12, i.e. at the rear side of the block of slats 20, an apertured plate 26 is attached which extends over the entire area of the rear wall of the block of slats 20 and which is arranged vertically, i.e. parallel to the longitudinal axis of the container. The apertured plate 26 has individual openings which are highly schematically indicated in FIG. 1 through which liquid can pass through the apertured plate 26.

A collection channel 28 is provided between the apertured plate 26 and the wall of the container 12 in the region of the block of slats 20 and is spatially separated from the remaining part of the container so that no liquid can move from the remaining part of the container 12 into the collection channel 28 and no liquid can move over from the collection channel 28 into the remaining part of the container 12. An outlet 16 is provided in the lower region of the collection channel 28' for the fraction low in solid particles by which the liquid guided through the slats and cleaned, i.e. the clarified water, can be extracted from the container 12. A lower region of the connection channel 28' is so designed that an approximately V-shaped region 30 forms between its upper boundary and the lower boundary of the block of slats 20.

Above the upper boundary of the lower region of the collection channel 28' an infeed divider 32 is provided which includes an inlet 14 for the suspension and also the deflection means 34. The deflection means 34 is of hood-like design and open at its lower side and also sidewise.

Finally, the container 12 of the flotation apparatus 10 has a (schematically illustrated) skimming device 36 as a mud scraper which in turn has an outlet 18 for the fraction rich in solid particles.

As shown in FIG. 2 the block of slats 20 is arranged in the embodiment shown in FIG. 1 with its rear wall close to the wall of the container 12 and extends up to the vicinity of the centre of the container 12. As a result of the rectangular shape in cross-section of the block of slats 20, a horseshoe-shaped region indicated in FIG. 2 by the broken line results in a cross-section of the container in which no slats are present.

In distinction to the embodiment shown in FIG. 1 the container 12 of the embodiment shown in FIG. 3 has two blocks of slats 20 which respectively have the shape of an oblique parallelepiped. The two blocks of slats 20 are each arranged with their rear side close to the wall of the container 12 and extend up to a spacing from the centre of the container 12, with the two blocks of slats 20 being point-symmetrically arranged relative to the longitudinal axis of the container.

Figure 4:
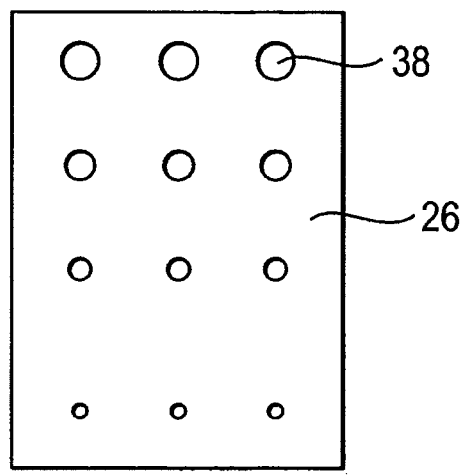

As shown in FIGS. 4 and 5 the apertured plate attached to the rear side of the block of slats 20 has a plurality of openings or holes 38, with the sum of the areas of the individual openings 38 in the upper region of the plate per square centimeter of the plate being larger than the sum of the areas of the individual openings 38 in the lower region of the plate per square centimeter of the plate.

This is achieved in the case of the apertured plate 26 shown in FIG. 4 in that the areas of individual openings 38 successively increase from the lower end of the plate 26 up to the upper end of the plate 26, with the number of openings per square centimeter in the lower region of the apertured plate 26 and in the upper region of the apertured plate 26 each being of the same size.

In distinction this is achieved in the case of the apertured plate 26 shown in FIG. 5 in that the number of openings 38 provided per square centimeter successively increases from the lower region of the apertured plate 26 up to the upper region of the apertured plate 26, with the area of the individual openings 38 each being of the same size.

Reference Numeral List 10 flotation apparatus
12 container
14 inlet (feed line) for suspension
16 outlet for the fraction low in solid particles
18 outlet for the fraction rich in solid particles
20 block of slats
22 slat
24 channel
26 apertured plate
28 collection channel
28' lower region of the collection channel
V-shaped region
32 infeed distributor
34 deflection means
36 skimming device
38 openings or holes

The invention claimed is:

1. A flotation apparatus (10) for the separation of solid particles from a suspension while forming a fraction low in solid particles and a fraction rich in solid particles, the apparatus comprising a container (12) having at least one block of slats (29) assembled from slats (22) arranged above one another, an inlet (14) for the suspension, an outlet (16) for the fraction low in solid particles which has been led through the slats, and also having a skimmer device (36) as a mud scraper which has an outlet (18) for the fraction rich in solid particles, wherein at a side of the at least one block of slats (20) oriented towards the container wall there is arranged a plate (26) extending over at least a part of the side of the block of slats (20), with the plate (26) having a plurality of openings (38) which enable the passage of liquid through the plate (26), with the sum of the areas of the individual openings (38) in the upper region of the plate (26), related to the vertical direction, per square centimetre of the plate (26) being larger than the sum of the areas of the individual openings (38) in the lower region of the plate (26) per square centimetre of the plate (26) and wherein the inlet (14) for the suspension is arranged in the lower region of the container and is designed such that it brings about, related to the container cross-section, a central, vertically upwardly directed flow.

2. A flotation apparatus (10) in accordance with claim 1, characterized in that
the sum of the areas of the individual openings (38) related to the total area of the plate (26) amounts to 0.1 to 20%.

3. A flotation apparatus (10) in accordance with claim 1, characterized in that
the sum of the areas of the individual openings (38) per square centimetre of the plate (26) related to the vertical increases from the bottom to the top in the manner of a gradient, with the sum of the areas of the individual openings (38) per square centimetre of the plate preferably increasing from the bottom to the top inversely proportional to the hydrostatic pressure which prevails in the respective region of the container (12).

4. A flotation apparatus (10) in accordance with claim 1, characterized in that
more openings (38) per square centimetre are provided in the upper region of the plate (26) than in the lower region of the plate (26).

5. A flotation apparatus (10) in accordance with claim 4, characterized in that
the individual openings (38) each have an area of the same size or each opening (38) has at least 70% of the area of the largest opening (38).

6. A flotation apparatus (10) in accordance with claim 1, characterized in that
the openings (38) of the upper region of the plate (26) each have a larger area than the individual openings (38) in the lower region of the plate (26).

7. A flotation apparatus (10) in accordance with claim 6, characterized in that
70 to 130% as many openings (38) per square centimetre are provided in the upper region of the plate (26) as in the lower region of the plate (26).

8. A flotation apparatus (10) in accordance with claim 1, characterized in that
the openings (38) have an elliptical, circularly round, rectangular or square cross-section.

9. A flotation apparatus (10) in accordance with claim 1, characterized in that
the apertured plate is arranged such that it has an inclination related to the vertical of 0 to 45°.

10. A flotation apparatus (10) in accordance with claim 1, characterized in that
the individual slats (22) of the at least one block of slats (20) are arranged substantially parallel to one another.

11. A flotation apparatus (10) in accordance with claim 1, characterized in that
the individual slats (22) of the at least one block of slats (20) are obliquely arranged outwardly relative to the cross-section of the container (12) and downwardly relative to the horizontal.

12. A flotation apparatus (10) in accordance with claim 11, characterized in that
the individual slats (22) of the at least one block of slats (20) have an inclination related to the horizontal of 5 to 75°.

13. A flotation apparatus (10) in accordance with claim 1, characterized in that
at least some of the slats (22) have a comb-like structure.

14. A flotation apparatus (10) in accordance with claim 1, characterized in that
the at least one block of slats (20) is present in the form of an oblique parallelepiped.

15. A flotation apparatus (10) in accordance with claim 1, characterized in that
the container (12) has a circular, elliptical or polygonal cross-section.

16. A flotation apparatus (10) in accordance with claim 1, characterized in that
it has two to four blocks of slats (20) which are uniformly distributed over the cross-section of the container (12) and which are each made in the form of an oblique parallelepiped.

17. A flotation apparatus (10) in accordance with claim 1, characterized in that
it has a blocks of slats (20) which is made in the form of an oblique parallelepiped and which extends from the centre of the container up to a spacing from the container wall.

18. A flotation apparatus (10) in accordance with claim 17, characterized in that
the container (12) has a circular cross-section.

19. A flotation apparatus (10) in accordance with claim 1, characterized in that
the inlet (14) for the suspension includes a feed line (14) and a deflection means (34) which is of hood-like shape with the upper region of the hood relative to the vertical being closed and the lower region and the side region of the hood being open, with the deflection means (34) being arranged perpendicular to the longitudinal axis of the container.

20. A flotation apparatus (10) in accordance with claim 1, characterized in that
a collection channel (28) for the fraction low in sold particles is provided behind the plate (26) arranged at the rear side of the at least one block of slats (20) and is spatially separated from the remaining part of the container (12).

21. A flotation apparatus (10) in accordance with claim 1, characterized in that
it has a feed for chemical additives in the region of the inlet (14) for the suspension.

22. A method for the separation of solid particles from a suspension while forming a fraction low in solid particles and a fraction rich in solid particles,
characterized in that
this is carried out in a flotation apparatus (10) for the separation of solid particles from a suspension while forming a fraction low in solid particles and a fraction rich in solid particles, the apparatus comprising a container (12) having at least one block of slats (29) assembled from slats (22) arranged above one another, an inlet (14) for the suspension, an outlet (16) for the fraction low in solid particles which has been led through the slats, and also having a skimmer device (36) as a mud scraper which has an outlet (18) for the fraction rich in solid particles, wherein at a side of the at least one block of slats (20) oriented towards the container wall there is arranged a plate (26) extending over at least a part of the side of the block of slats (20), with the plate (26) having a plurality of openings (38) which enable the passage of liquid through the plate (26), with the sum of the areas of the individual openings (38) in the upper region of the plate (26), related to the vertical reaction, per square centimetre of the plate (26) being larger than the sum of the areas of the individual openings (38) in the lower region of the plate (26) per square centimetre of the plate (26) and wherein the inlet (14) for the suspension is arranged in the lower region of the container and is designed such that it brings about, related to the container cross-section, a central, vertically upwardly directed flow.

* * * * *